United States Patent
Osipov et al.

(10) Patent No.: US 12,498,834 B2
(45) Date of Patent: Dec. 16, 2025

(54) GRAPHICAL USER INTERFACE FOR TRANSFORMABLE DISPLAY

(71) Applicant: Cubios, Inc., Sarasota, FL (US)

(72) Inventors: Ilya Osipov, Sarasota, FL (US); Varvara Osipov, Sarasota, FL (US)

(73) Assignee: Cubios, Inc., Sarasota, FL (US)

( * ) Notice: Subject to any disclaimer, the term of this patent is extended or adjusted under 35 U.S.C. 154(b) by 152 days.

(21) Appl. No.: 18/287,399

(22) PCT Filed: Apr. 19, 2022

(86) PCT No.: PCT/US2022/025436
§ 371 (c)(1),
(2) Date: Oct. 18, 2023

(87) PCT Pub. No.: WO2022/225993
PCT Pub. Date: Oct. 27, 2022

(65) Prior Publication Data
US 2024/0201819 A1 Jun. 20, 2024

Related U.S. Application Data
(60) Provisional application No. 63/176,459, filed on Apr. 19, 2021.

(51) Int. Cl.
G06F 3/048 (2013.01)
G06F 1/16 (2006.01)
G06F 3/0481 (2022.01)
G06F 3/14 (2006.01)
(Continued)

(52) U.S. Cl.
CPC .......... *G06F 3/0481* (2013.01); *G06F 1/1622* (2013.01); *G06F 1/1647* (2013.01); *G06F 3/1438* (2013.01); *G06T 11/60* (2013.01); *G06T 13/80* (2013.01)

(58) Field of Classification Search
CPC .... G06F 3/0481; G06F 1/1622; G06F 1/1647; G06F 3/1438; G06T 11/60; G06T 13/80
See application file for complete search history.

(56) References Cited

U.S. PATENT DOCUMENTS

| | | | | |
|---|---|---|---|---|
| 2012/0302303 A1* | 11/2012 | Rosendo | ............... | A63F 9/0842 463/9 |
| 2015/0352435 A1* | 12/2015 | Imai | ....................... | A63F 13/92 463/9 |
| 2018/0373329 A1 | 12/2018 | Fisunenko et al. | | |

(Continued)

FOREIGN PATENT DOCUMENTS

KR 101853728 5/2018

OTHER PUBLICATIONS

International Search Report of PCT Application No. PCT/US2022/025436, dated Aug. 4, 2022.
(Continued)

*Primary Examiner* — Haoshian Shih
(74) *Attorney, Agent, or Firm* — Dhiraj Jindal; PATENT YOGI LLC

(57) ABSTRACT

A graphical user interface (GUI) facilitates dynamic user interaction with visual-narrative content such that the visual-narrative content is displayed on a plurality of electronic displays that are movable relative to one another, and the content is visually modified in response to movement of the display screens.

18 Claims, 10 Drawing Sheets

(51) Int. Cl.
    *G06T 11/60*     (2006.01)
    *G06T 13/80*     (2011.01)

(56) References Cited

U.S. PATENT DOCUMENTS

| | | |
|---|---|---|
| 2019/0358549 A1 | 11/2019 | Osipov |
| 2020/0051460 A1 | 2/2020 | Bedor et al. |
| 2020/0326758 A1 | 10/2020 | Oakley |
| 2020/0403956 A1* | 12/2020 | Adamski ............... H04L 51/216 |
| 2021/0387094 A1* | 12/2021 | Young ................... A63F 13/87 |

OTHER PUBLICATIONS

Written Opinion of PCT Application No. PCT/US2022/025436, dated Aug. 4, 2022.

* cited by examiner

GRAPHICAL USER INTERFACE FOR TRANSFORMABLE DISPLAY

PRIORITY

This application claims the benefit of U.S. Provisional Application No. 63/176,459, filed Apr. 19, 2021, the disclosure of which is incorporated by reference herein.

TECHNICAL FIELD

Aspects of the invention relate generally to computer architecture and software and, more particularly, to a graphical user interface for a portable handheld device having a transformable display.

BACKGROUND

A new type of multimedia device, marketed as the WOWCUBE® entertainment system is described in U.S. Pat. Nos. 10,886,050, 11,000,772, the disclosures of which are incorporated by reference herein. The WOWCUBE® entertainment system is an example of an electronic display device that has a mechanically-transformable display. In one implementation, it comprises a central body and a plurality of peripheral elements surrounding the central body which are movable by rotation about the central body. Each one of the peripheral elements has a plurality of outward-facing sides facing away from the central body and each one of the outward-facing sides has a microprocessor-controllable electronic display screen. The result of such an arrangement is a three-dimensional handheld display device that has displays on all sides. The device includes sensors that can detect movement of the device as a whole, as well as relative movement of the peripheral elements.

Comics, manga, graphic novels, and sequential art or storytelling are examples of a visual form of media in which narratives are presented by a series of illustrations. For the sake of brevity, this form of media is referred to herein as visual-narrative media. Visual-narrative media may or may not include a linguistic aspect, such as captions or speech bubbles. Although the media is most often used for humor or fictional storytelling genres, it has applications in numerous other areas, such as instruction guides, safety manuals, educational materials, and the like.

Recent advances in personal computing devices such as smartphones, tablets, and laptop computers with touchscreens, gaming systems, as well as in virtual- and augmented-reality (VR/AR) systems, have given rise to interactive visual narratives, sometimes referred to as digital comics, in which the reader, though a graphical user interface (GUI), can affect or control the flow or progression of a given narrative. For example, the sequential advancement of images may be controllable by the reader, allowing the reader to proceed at a preferred pace. As another example, a GUI may provide controls for the reader to advance in forward and reverse directions, or to follow different branching storylines. The nature and extent of interactivity between the user and the media is generally constrained by the practical limitations of the GUI.

It would be desirable to utilize a three-dimensional, "volumetric," GUI of the WOWCUBE® entertainment system, or other type of transformable-display device, to display interactive media content for users. However, with its unique multi-sided and transformable display, the WOWCUBE® entertainment system's GUI presents some practical challenges for developers and technologists to adapt their media content for an intuitive and engaging experience with users that has negligible complexity. Other types of transformable-display devices would present similar challenges that would be specific to their particular respective display configurations and nature of transformability. A practical solution is needed to these, and related, challenges.

SUMMARY

According to one aspect of the disclosure, a transformable-display device includes a plurality of peripheral elements situated around a central body, each of the peripheral elements including outward-facing surfaces and a plurality of electronic displays on the outward-facing surfaces. The peripheral elements are movable and repositionable relative to other ones of the peripheral elements to achieve different device configuration states. Computing hardware is arranged in one or more of the peripheral elements, including at least one processor, memory, and display controller circuitry. The computing hardware is operatively coupled to each of the electronic displays. The computing hardware is operative to implement a graphical user interface (GUI) that facilitates dynamic user interaction with visual-narrative content such that the visual-narrative content is displayed on the plurality of electronic displays and visually modified in response to movement of the peripheral elements.

In a related aspect, a GUI may be implemented in a transformable-display device having multiple display screens movable relative to one another. The GUI initially displays a panel of interest that includes a plurality of panel sections spanning a corresponding plurality of the display screens. The initially displaying of the panel of interest includes displaying the panel sections in a fragmented configuration on non-adjacent display screens. The GUI tests whether, through movement of the display screens, the initially-displayed sections of the panel of interest are aligned to form a contiguous image across adjacent display screens, and in response to a result of the testing being indicative of successful alignment of the panel of interest, updates the displaying of the panel of interest with at least one image enhancement.

BRIEF DESCRIPTION OF THE DRAWINGS

In the drawings, like numerals may describe similar components in different views. Some embodiments are illustrated by way of example, and not limitation, in the figures of the accompanying drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Reference throughout this specification to "an embodiment", "one embodiment", "one implementation", "one aspect", or "an implementation" means that a particular feature, structure or characteristic described in connection with the implementation is included in at least one implementation. Thus, the appearances of the phrases "in one implementation", "in an implementation", "in one aspect", "in an example", "in an embodiment", or the like, in various places throughout this specification are not necessarily all referring to the same implementation. Furthermore, the particular features, structures, or characteristics may be combined in any suitable manner in one or more implementations.

Unless the context requires otherwise, throughout the specification and claims that follow, the word "comprising" or "comprises" is synonymous with "including" or "includes" and is inclusive or open-ended (i.e., does not exclude additional, unrecited elements or method acts).

As used in this specification and the appended claims, the singular forms "a," "an," and "the" include plural referents unless the content clearly dictates otherwise. It should also be noted that the term "or" is generally employed in its inclusive-or sense (i.e., "and/or"), unless an exclusive-or interpretation is expressly and unambiguously set forth.

The headings and Abstract of the Disclosure provided herein are for convenience only and do not interpret the scope or meaning of the embodiments.

System Overview

One aspect of the embodiments is directed to a graphical user interface (GUI) for a transformable-display device in which the display is mechanically transformable into different configurations, and such transformation of the display device is interpreted by the device as a type of user input. An example of such a device is the WOWCUBE® entertainment system briefly described above. However, it should be noted that aspects of the embodiments may be applicable to other types of transformable-display devices of various form factors (e.g., rectangular-prism, hexagonal-prism, pyramidal, cylindrical, spherical, rhomboid prism, conical, or irregular).

Figure 1B:
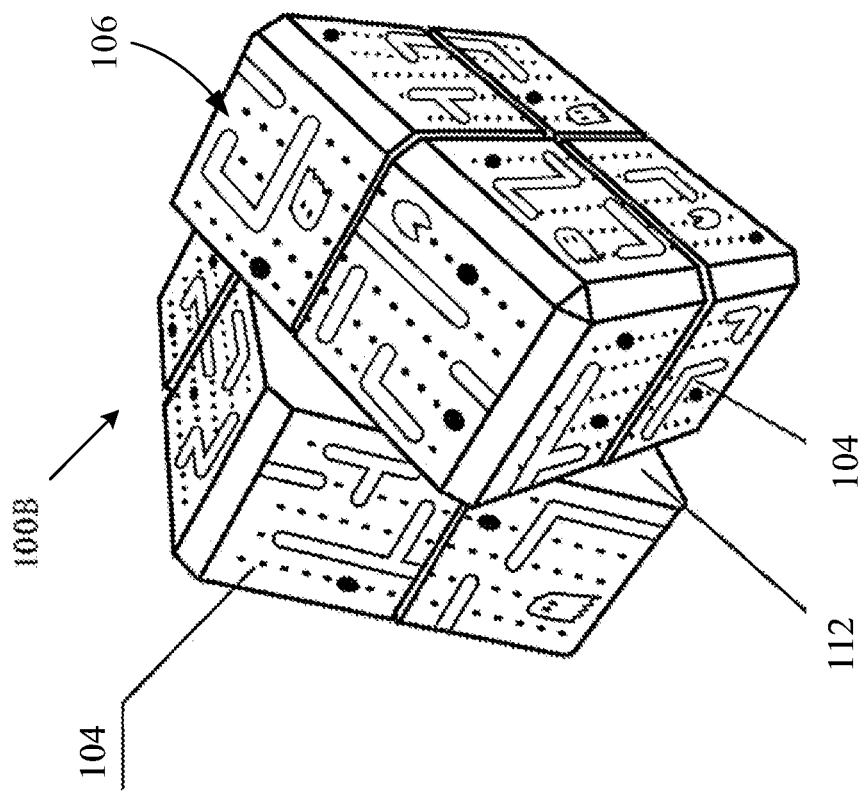
FIGS. 1A-1B illustrate one example embodiment of a transformable-display device in which aspects of the present subject matter may be implemented.
Figure 1A:
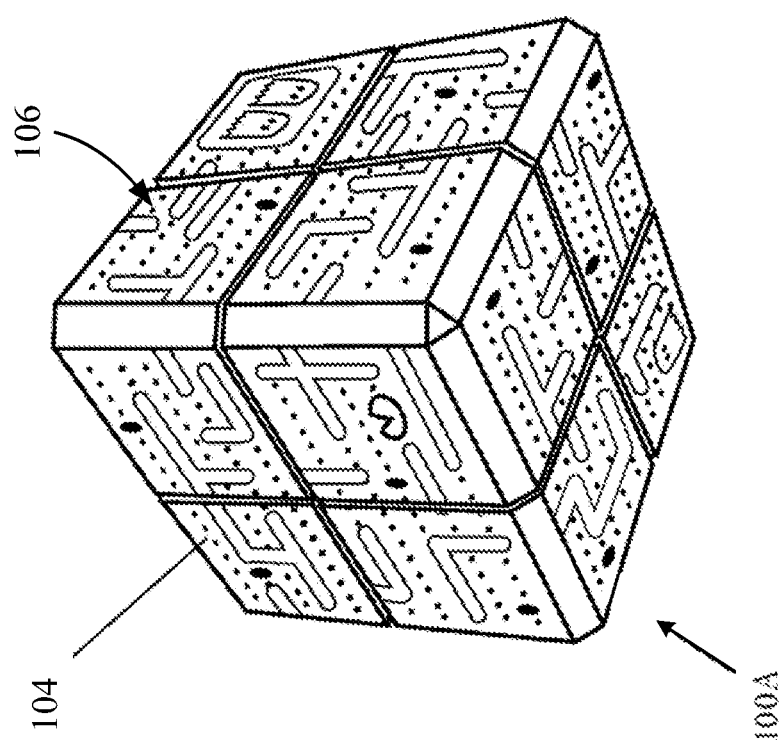

FIGS. 1A-1B illustrate one example embodiment of a transformable-display device. As depicted in FIG. 1A, the device in first mechanical state 100A comprises 8 peripheral elements 104 in the shape of cubelets, which are assembled as a larger cube. In this example, each of the peripheral elements 104 may be referred to as a cubelet. Each cubelet in this example comprises three orthogonal electronic displays 106.

In FIG. 1B, the device is in a second mechanical state 100B, namely, the device is in a twisted, or rotationally-offset, position along interior interface 112.

Figure 2:
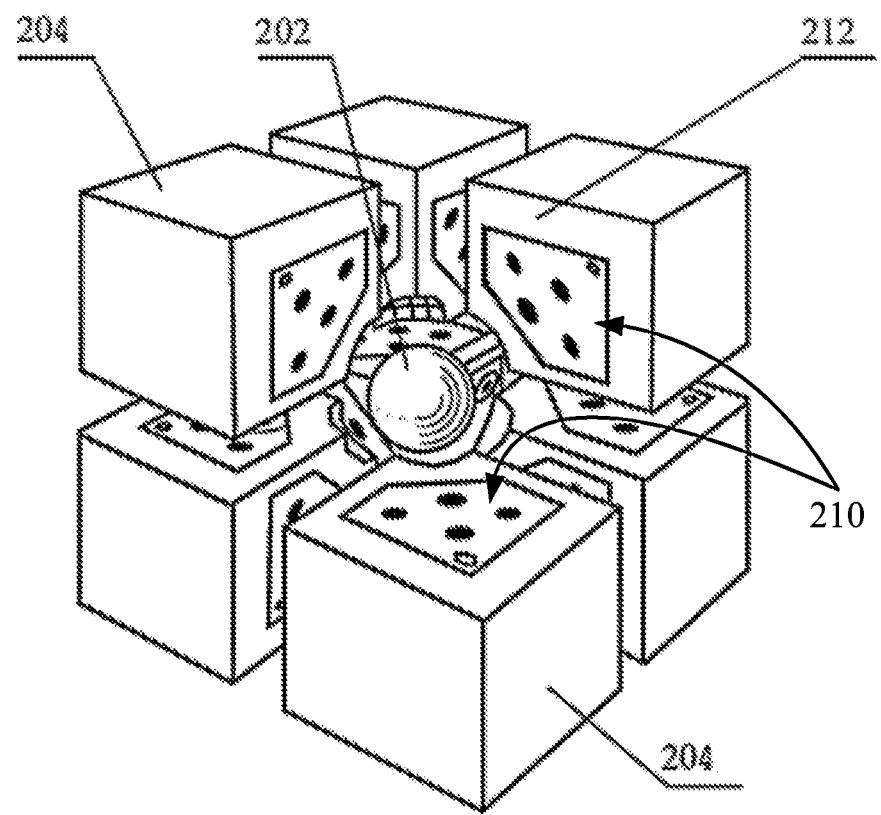
FIG. 2 is a partially-cut-away and exploded-view diagram illustrating various additional components of the interior of a transformable-display device such as the example device of FIGS. 1A-1B.

FIG. 2 is a partially-cut-away and exploded-view diagram illustrating various additional components of the interior of a transformable-display device such as the example device of FIGS. 1A-1B. At the center of the device is central body 202 which, in this example as depicted, is spherical. Each peripheral element 204 (which has one or more electronic displays—not shown for clarity—on one or more of its outer-facing surfaces) is pivotable about central body 202, and has an interior interface 212. Groups of electrical connectors 210 are provided at an interior surface of each peripheral element 204. Electrical connections among the groups of electrical connectors 210 are made and broken as the device is mechanically reconfigured by twisting of the device along interior interface 212.

Notably, the state of connection of electrical connectors 210 is indicative of the configuration of the device. In some embodiments, the connectors are used to determine, for a given peripheral element, which other peripheral elements are adjacent to that peripheral element. Likewise, the state of the connections may be used to indicate whether the transformable displays are in an aligned state, or whether the device is in a transitional state.

Figure 3:
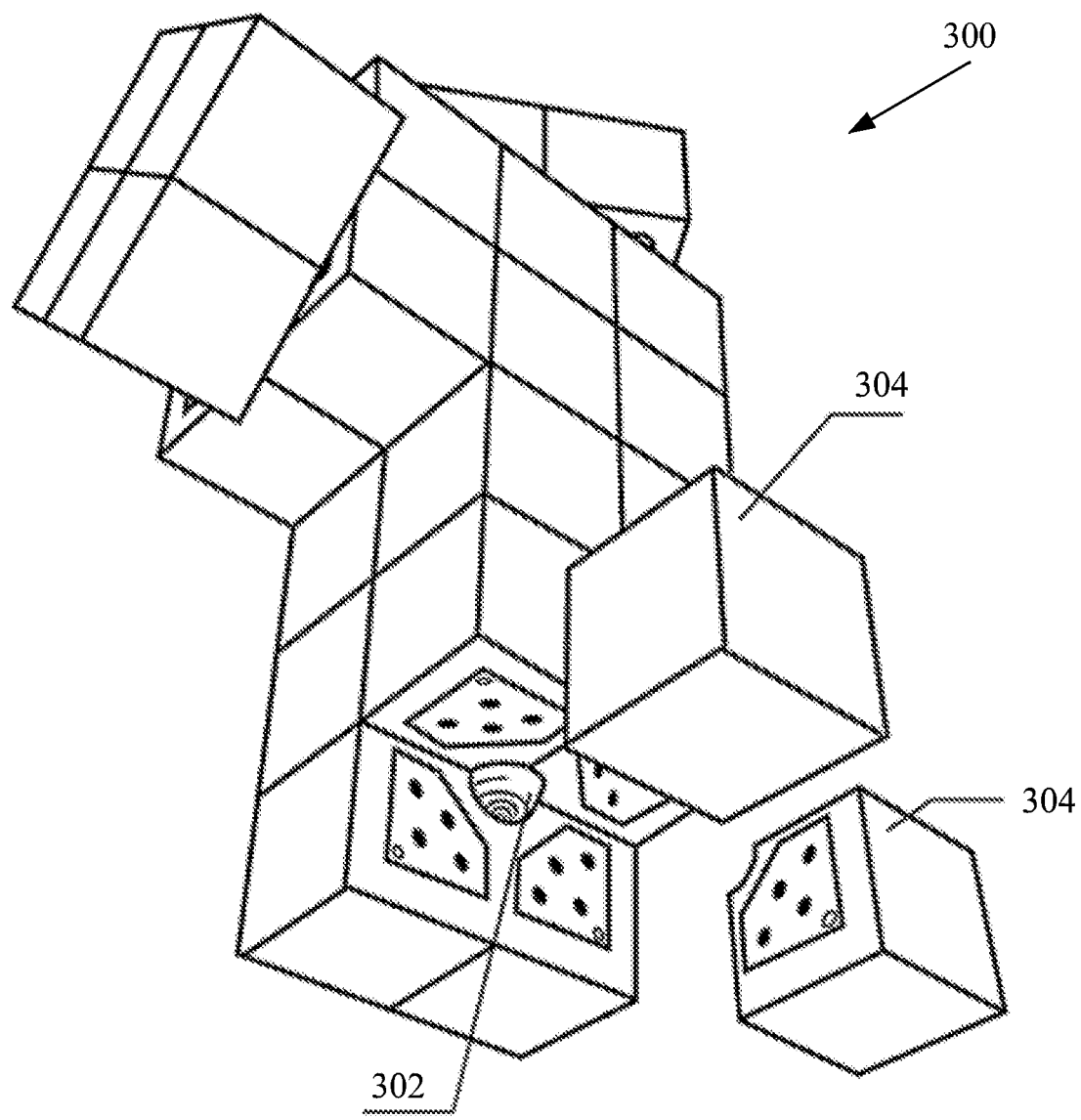
FIG. 3 illustrates an example of an irregularly-shaped transformable-display device according to another embodiment in which aspects of the present subject matter may be implemented.

FIG. 3 illustrates an example of an irregularly-shaped transformable-display device 300 according to another embodiment in which aspects of the present subject matter may be implemented. As depicted, the device may have multiple central bodies 302 (only one central body 302 is pictured for clarity), and may include a greater number of peripheral elements 304, as shown. Peripheral elements 304 in this example are cubelets, although in other form factors, the peripheral elements may have other shapes, such as cylindrical, pyramidal, hexagonal-prism, or otherwise. Each of peripheral elements 304 has one or more electronic displays (not shown) on its outer-facing surface.

Figure 4:
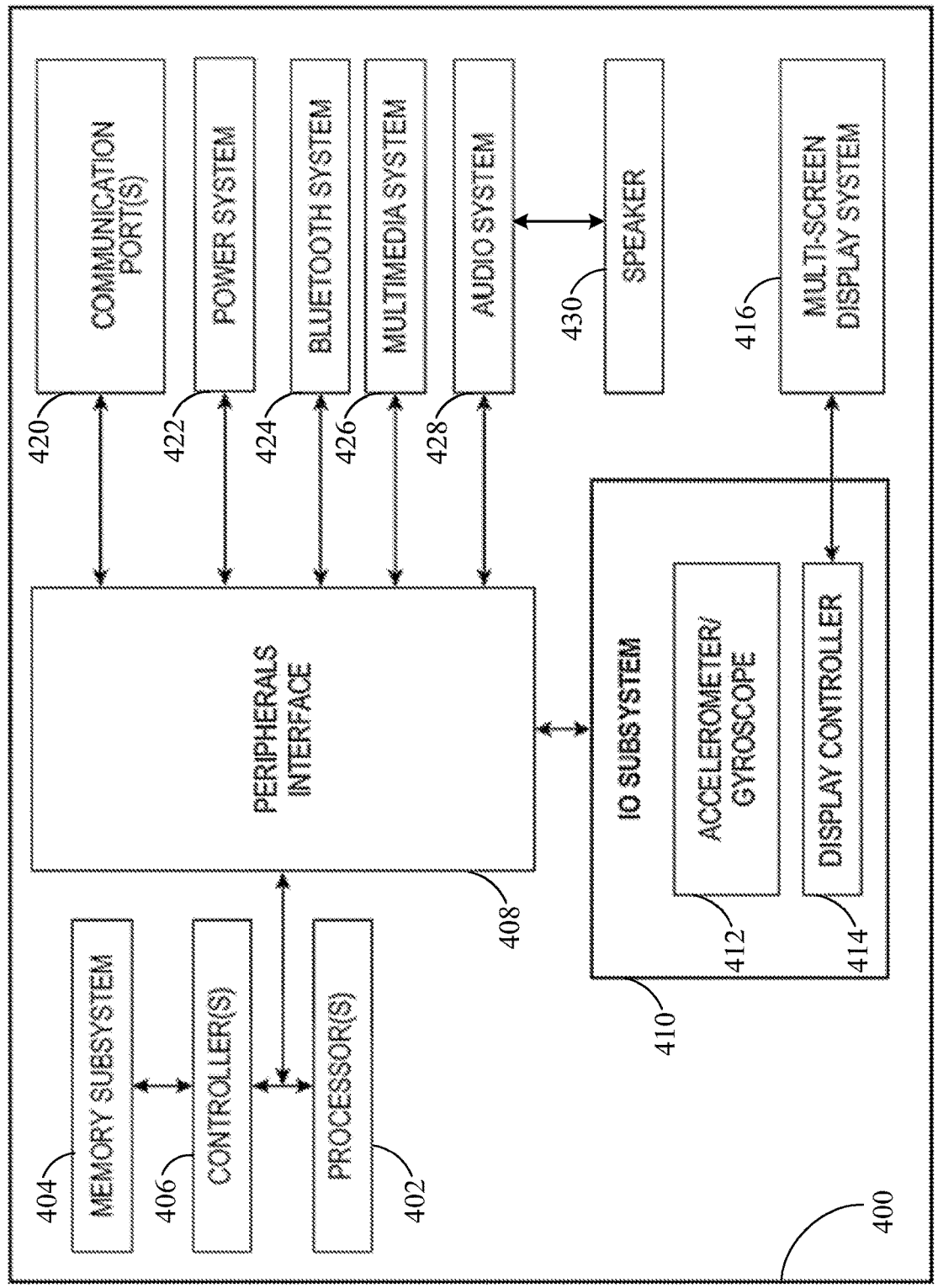
FIG. 4 is a system block diagram illustrating an example architecture of computing hardware of a transformable-display device, such as any of the devices described above with reference to FIGS. 1A-3.

FIG. 4 is a system block diagram illustrating an example architecture of computing hardware 400 of a transformable-display device, such as any of the devices described above with reference to FIGS. 1A-3. Computing hardware 400 may be variously arranged or distributed within or among all, one, or some plural subset of peripheral elements of the device.

Computing hardware 400 includes one or more processors 402. Each processor comprises hardware-based circuitry that may include components such as an arithmetic logic unit (ALU), an accumulator, an instruction register and an instruction pointer, cache memory, a memory management unit (MMU), a control unit, and a clock. Any suitable processor architecture may be utilized, such as a complex instruction set computer (CISC), reduced instruction set computer (RISC), graphics processor unit (GPU), digital signal processor (DSP), or the like. The one or more processors 402 may be organized as one or more processor cores with shared data or address interconnect, cache, or other components.

In the example depicted, the one or more processors 402 may be coupled to memory subsystem 404 via one or more controllers 406, such as a memory controller. Memory subsystem 404 may include random access memory (RAM), read-only memory (ROM), erasable non-volatile memory (e.g., flash EEPROM, solid-state drive (SSD)), or the like. Memory subsystem 404 may include program instructions for an operating system, or for one or more applications. Various embodiments may or may not include an operating system. In any case, embodiments of the present disclosure contemplate instructions for implementing a GUI, whether by an operating system, an application program, or by some combination. Such instructions may be provided as software, firmware, or as a combination thereof. Therefore, such instructions are provided in a non-transitory storage medium and are readable by the one or more controllers 406.

Memory subsystem 404 may also store data, including media content (textual, graphical, or some combination) to be displayed on the transformable display, as well as user data, preferences, performance or usage logs, operational-state information, and the like. In addition, memory subsystem 404 may store temporary run-time program instructions, variables, and data as a "scratch-pad" memory.

The one or more processors 402 may also be coupled to peripherals interface 408 (e.g., bus architecture), which facilitates communication with input/output (I/O) subsystem 410 that includes sensors 412, such as a multi-axial accelerometer and gyroscope operative to detect translational and rotational motion of the device, and display controller 414 (e.g., including decoder and display driver circuitry). Display controller 414, in turn, is coupled to multi-screen display system 416, which comprises the plurality of electronic displays situated at the outward-facing surfaces of the peripheral elements 104, 204, 304 described above (such as displays 106). The display screens may be implemented using thin-film-transistor (TFT) liquid-crystal display (LCD), light-emitting-diode (LED) display, organic LED (OLED), active-matrix OLED, (AMOLED), or other suitable display technology.

As depicted, peripherals interface 408 facilitates signal and power communication with communication ports 420 (e.g., universal asynchronous receiver-transmitter (UART) for serial communications and line-driving circuitry), power system 422 (e.g., battery(ies), charging circuitry, wireless power-transfer circuitry, power-regulating circuitry), Bluetooth system 424 or other wireless communications system (e.g., personal-area network (PAN), near-field communication (NFC), wireless local-area network such as 802.11-type WiFi, or other), multimedia system 426 (e.g., graphics co-processor), and audio system 428, which may be coupled to a sound-transducer device such as a speaker 430 or microphone (not shown).

GUI for Facilitating Dynamic User Interaction with Visual-Narrative Media

Figure 5:
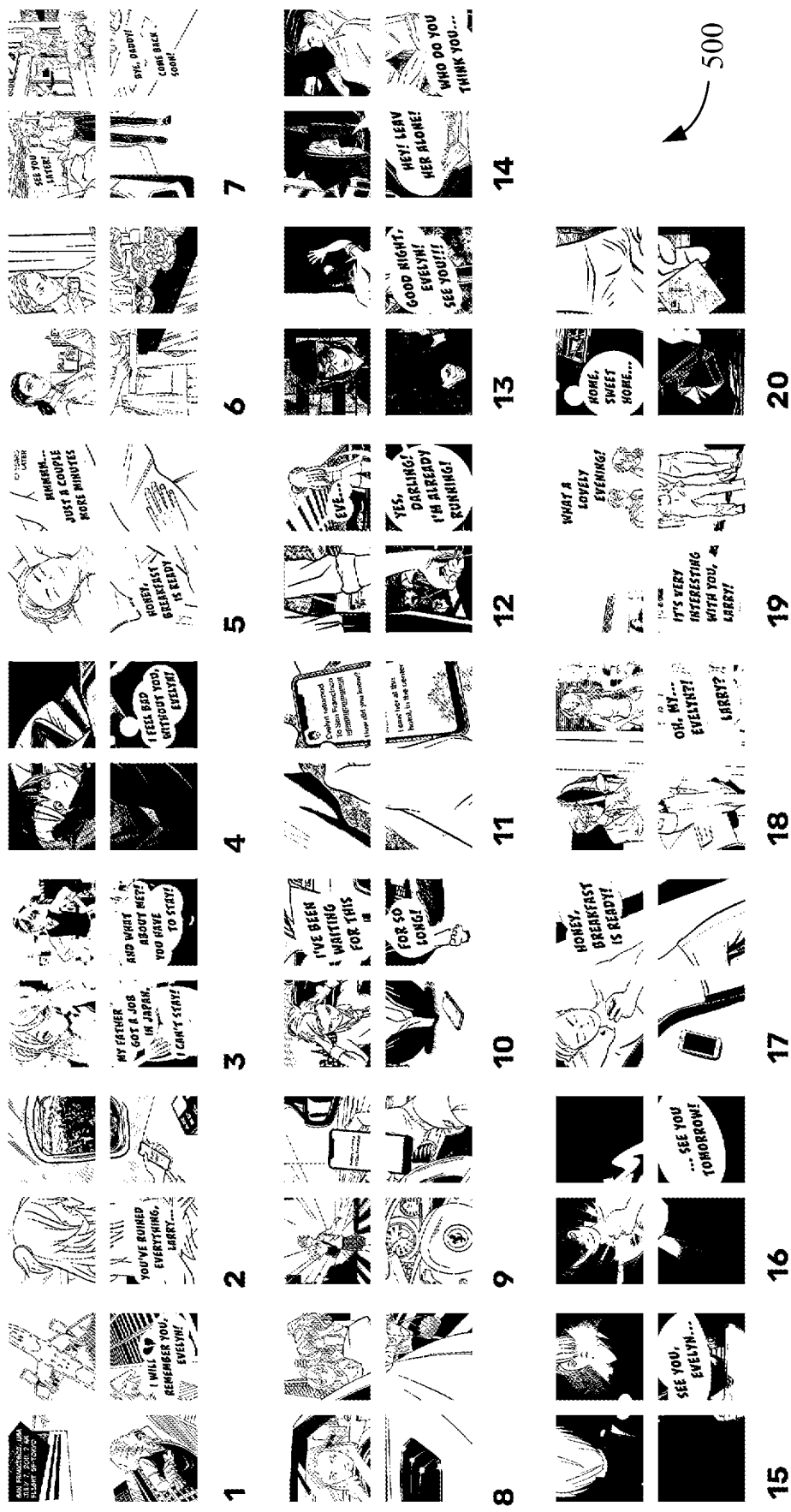
FIG. 5 is an example of visual-narrative content to be displayed on a transformable-display device such as the device described above with reference to FIGS. 1A-3.

In some embodiments, the GUI may be specifically adapted for displaying certain types of content, such as visual-narrative media as described above. FIG. 5 is an example of visual-narrative content 500 to be displayed on a transformable-display device such as the device described above with reference to FIGS. 1A-3. The sequence of images in this example are laid out in panels comprising sections (e.g., four quadrants in this instance) to span a 2×2 array of displays corresponding to one side of a transformable display device. However, it should be noted that in other implementations, the layout may be designed to wrap around the surface of the device to utilize the additional display screens situated on additional sides of the device. In this example, the contents comprise graphics and text, although in various other examples there may be graphics only, or text only. The narrative flow is shown as a numbered sequence of panels (numbered 1-20 in this example).

According to one embodiment, a GUI implemented on the device when executed (i.e., when instructions implementing the GUI are carried out on the one or more processors of the device), presents the panel sections in a shuffled order such that the user of the transformable display device is prompted to mechanically reconfigure the display device as described above by rotating the peripheral elements about the central body so as to place the panel sections into an organized order in order to read the contents of the panel.

In a related embodiment, the images of the panel sections are modified based on the display-positioning, i.e., the device configuration state of the transformable-display device, on motion of the device, on certain timing criteria, on other user input (e.g., sound, input via peripheral device), or on one or more combinations of these inputs or conditions. The modifications may include varying the quality of the displayed image, such as by saturating or de-saturating the color, changing the image size or resolution, blurring or pixelating the image, sharpening the image, changing the color temperature or tinting, or the like. The modifications may further include adding or removing certain displayed or displayable content, such as adding or removing text (captions, speech bubbles), or adding or removing animations or replacing a statically-displayed image with a video clip. Displayed content can therefore be automatically degraded, restored, or enhanced in response to a user's manipulation of, or other input provided to, the transformable-display device.

Figure 6:
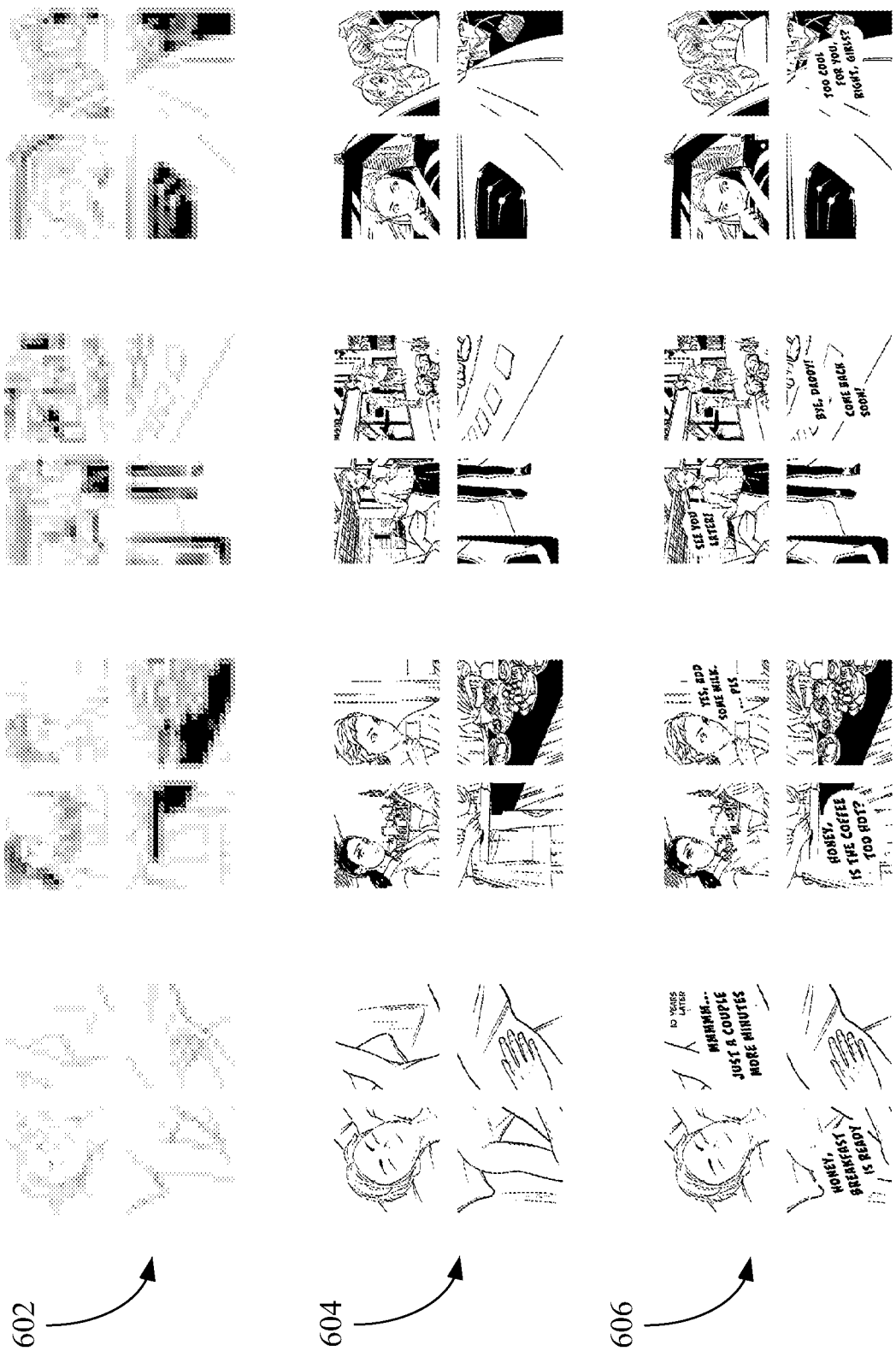
FIG. 6 is a diagram illustrating some examples of content modification that may be performed in response to a user's manipulation of, or other input provided to, the transformable-display device according to an embodiment.

FIG. 6 is a diagram illustrating some examples of content modification that may be performed in response to a user's manipulation of, or other input provided to, the transformable-display device according to an embodiment. Three versions of a sequence of four panels is shown (left-to-right). The sequence may be degraded (e.g., reduced color, resolution, etc.) as indicated at 602, baseline as indicated at 604, or enhanced, as indicated at 606 (with text added).

Figure 7B:
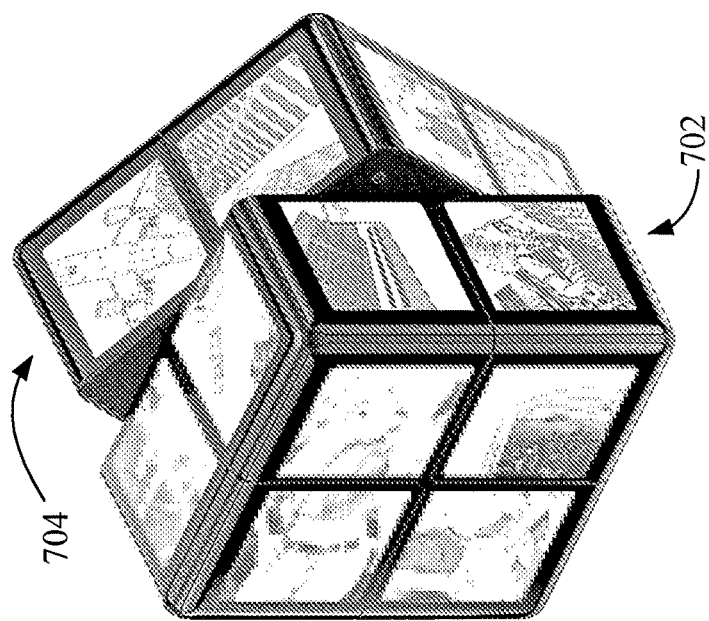
FIGS. 7A-7E illustrate an example of content modification being automatically implemented by the GUI of a transformable display device in response to a user's manipulation of the device according to an embodiment.
Figure 7A:
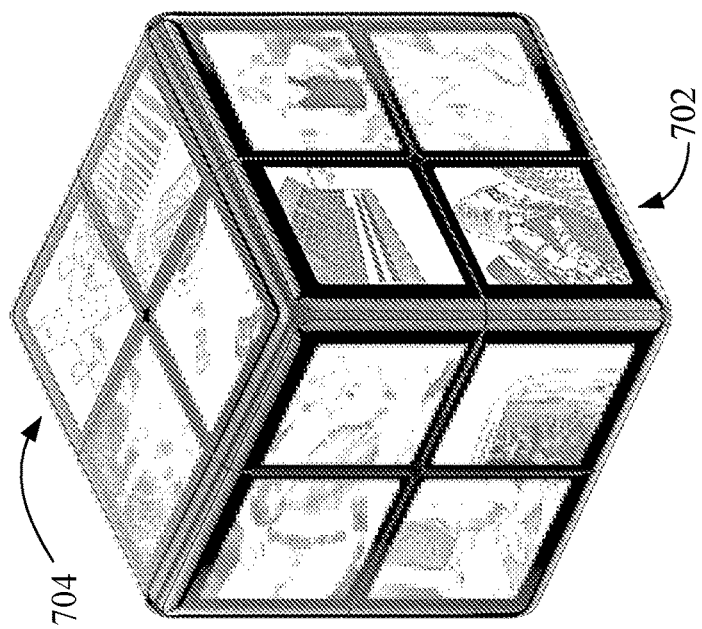

FIGS. 7A-7E illustrate an example of content modification being automatically implemented by the GUI of a transformable display device in response to a user's manipulation of the device according to an embodiment. In FIG. 7A an initial state of the device displays a first section 702 of a panel, and a second section 704 of the panel in a shuffled configuration where the two sections 702, 704 are on different faces of the device as shown. The two sections 704, 706 are indicated to the user as the operative sections for a panel of interest because their displayed image quality is baseline (with image quality as illustrated in FIG. 6 corresponding to sequence 604). The remaining panels and sections in this example are displayed by the device with degraded quality (with image quality as illustrated in FIG. 6 corresponding to sequence 602). In a related embodiment, the degradation is performed computationally on a baseline image by image processing. In another embodiment, a separate image of degraded quality is shown.

Figure 7C:
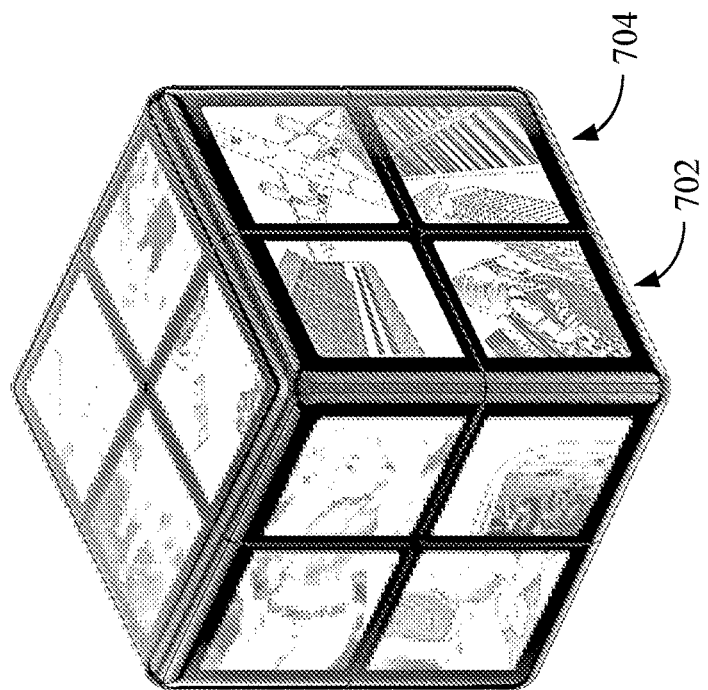

In this example, the user's objective is to assemble the panel of interest by manipulating the transformable display device to mechanically reconfigure the displays in order to properly un-shuffle the sections of the panel of interest. FIG. 7B illustrates such manipulation taking place with the device in an intermediate state. FIG. 7C illustrates panel sections 702 and 704 brought into alignment to complete the panel of interest.

Figure 7D:
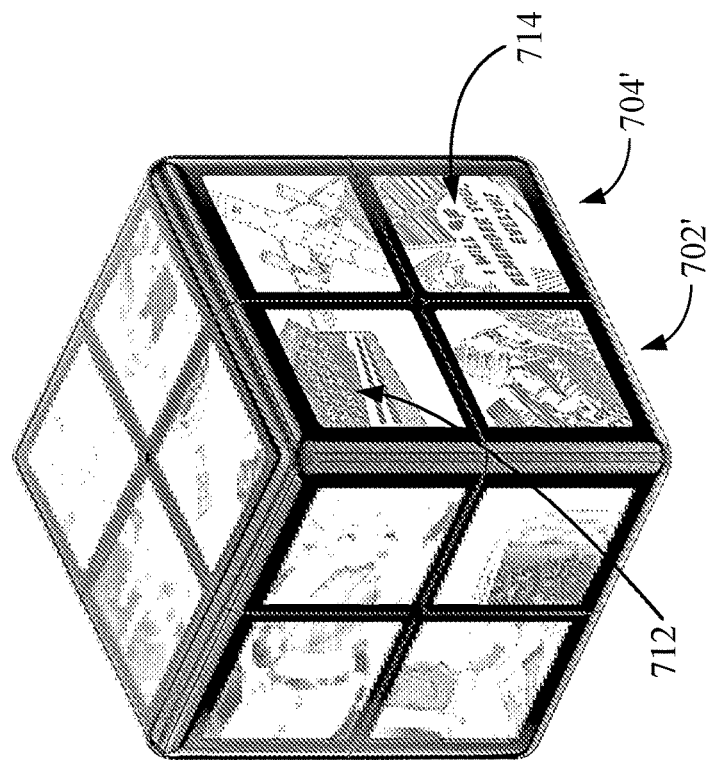
Figure 7E:
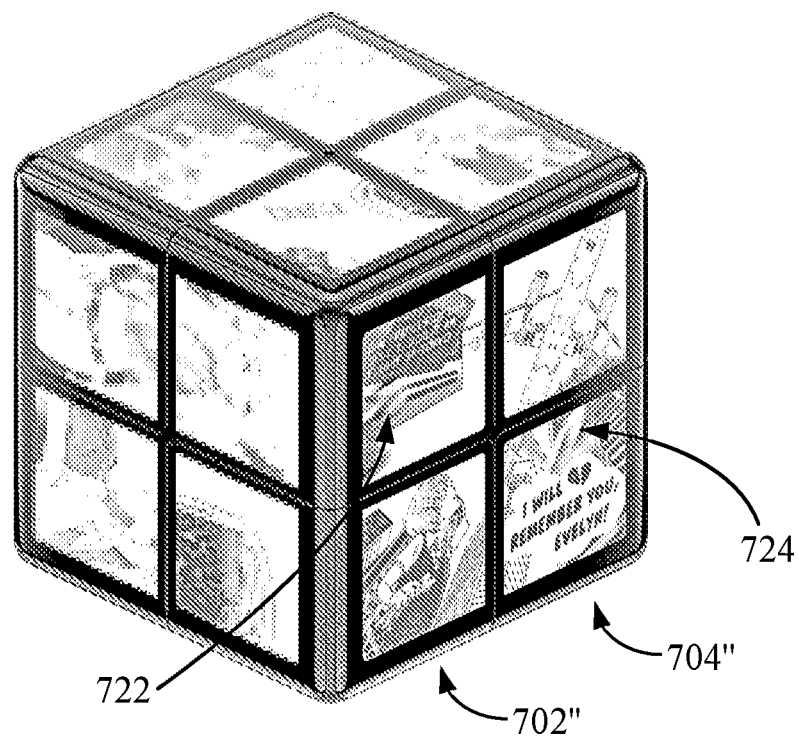

FIG. 7D illustrates an automated response by the GUI of the device to the achieved assembled-panel state. In this example, text 712 and 714 is added, resulting in enhanced panel sections 702' and 704'. FIG. 7E indicates a further enhancement, namely, the addition of animations 722 and 724, resulting in extra-enhanced panels 702" and 704". The animations may comprise additional content (e.g., rain, new object(s)) or movement of the existing content of the panel of interest. The animations may comprise a video clip, for example, which may add content to the plot of the narrative. The extra enhancement may occur in response to an additional condition, such as the passage of time (e.g., 3-4 seconds), or further user input, such as motion or shaking of the device, as measured by the movement transducers.

Figure 8:
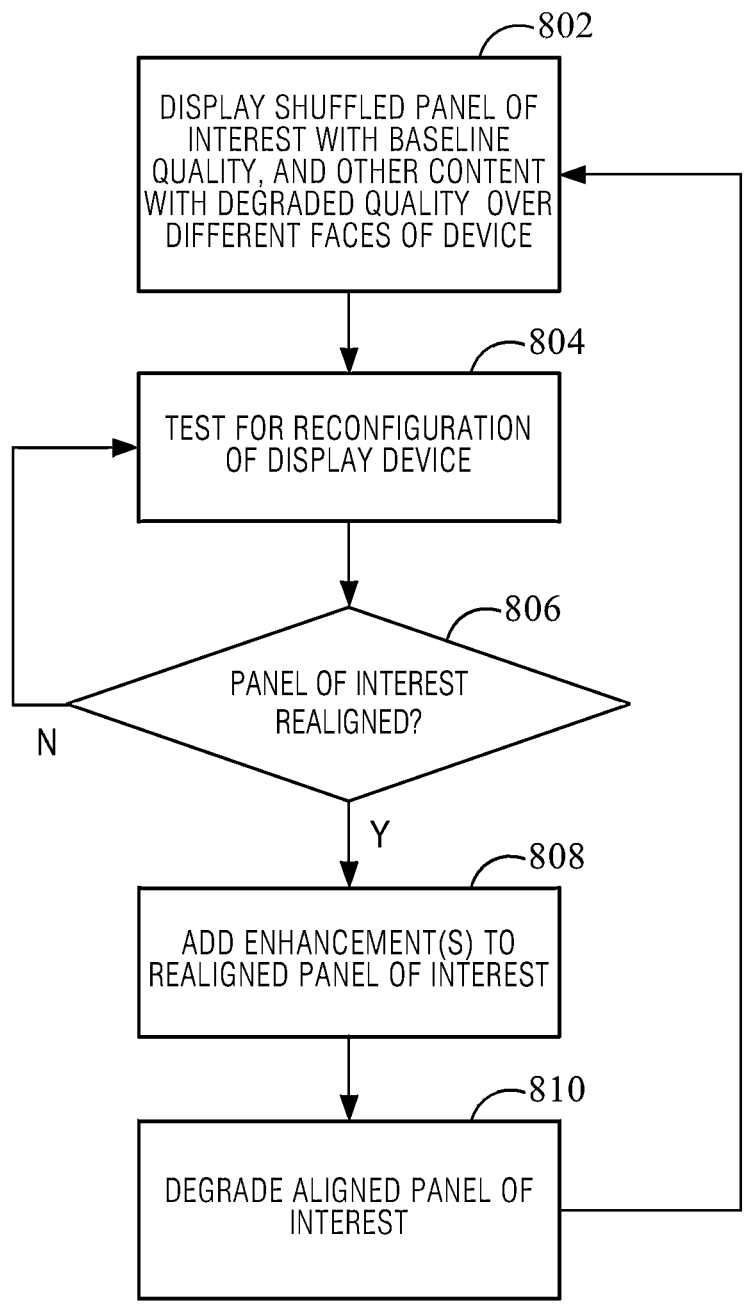
FIG. 8 is a flow diagram illustrating an example operational process that may be implemented by a GUI of a transformable-display device according to some embodiments.

FIG. 8 is a flow diagram illustrating an example operational process that may be implemented by a GUI of a transformable-display device according to some embodiments. At 802, the GUI displays sections of a panel of interest, in a shuffled, or fragmented, state, over different exterior surfaces of the device using different display screens. The GUI may place the sections of the panel of interest in a quasi-randomized manner, although the orientation of the sections may be specifically arranged so that the contents of those sections are properly aligned when the device is configured to place the panels in adjacent display screens on the same side of the device. Of course, a more challenging puzzle may reorient the display sections and accept additional user input to re-orient the sections. In general, the GUI may maintain a data structure of the locations of each section of the panel of interest such that awareness of the states of fragmentation or re-alignment of the panel of interest is determinable throughout any ensuing mechanical reconfiguration of the display device.

The fragmented sections of the panel of interest may be displayed with a baseline quality, as described above, and these baseline-quality panel sections may be displayed among other images that are displayed with a degraded quality according to one or more of the degradation techniques described above, or according to another suitable technique. Notably, some of the degraded-quality panel sections could have been sections of a previous panel of interest which has, in a sense, expired, in terms of the flow of the narrative of the visual-narrative media.

In operation, according to some embodiments, the device's processor(s) operate using preloaded panels of images from a visual-narrative media, which have been saved to the device's memory or are downloaded on demand during the operation process (e.g., via a radio channel) from a server. Each frame may be a vector or raster image. The of-interest and passive panel sections can be represented by two different images, or a common, automatically processed image, e.g. using a baseline view or special highlighting selector.

At 804, the GUI tests for reconfiguration of the transformable display device to bring the fragmented sections of the panel of interest into alignment on adjacent screens to form a contiguous image. Accordingly, the device may read the state of the electrical connections among the peripheral elements and determine the state of fragmentation of re-alignment of the sections of the panel of interest. During this phase of operation, the user may manipulate and mechanically reconfigure the display device to reposition the display screens relative to one another.

If, at decision 806, the panel of interest is determined to be realigned, the process advances to 808, where enhancements are added to the realigned panel of interest. The enhancements may include the addition of text, animation, or other enhancements. Notably, various enhancements may be applied over a timed sequence. For instance, the text may be displayed immediately or within some defined first period of time after realignment of the panel of interest is achieved, whereas animations or sound may be effected after a specified second period of time that may be greater than the first period of time. Alternatively or additionally, the animations may be effected in response to additional user input, such as movement or shaking of the device, voice input, or other input.

The animation effects, text, and speech balloons may be stored as raster or vector elements. Text may be stored as characters and text attributes (color, font, display coordinates) and can be translated into several languages. Events in an realigned panel are stored and played usually as data sequences, e.g., "graphic effect X", "animation of subimages displayed at the coordinates (x, y, z), text with preset attributes displayed at the coordinates (x, y, z), etc.

Additionally, the time delays (e.g., expressed in milliseconds) are also stored in memory as part of the GUI parameters, and may be made adjustable to allow users to set their preferences.

At 808, after completion of any animations, or after an elapsed third period of time following realignment of the panel of interest, the aligned panel of interest may be expired. Accordingly, the panel's image quality may be degraded. The process loops back to operation 802 for a new operation cycle with a new panel of interest.

As the user proceeds through a sequence of cycles of the process of FIG. 8, the user learns the storyline of the visual-narrative media while interacting with the media. In more sophisticated embodiments, multiple plot lines may be made available to the user, such as with the use of additional available panel sections which the user may select to place into alignment. Accordingly, the user may interactively follow different branches in the plotline's sequence.

Additional complexity may be facilitated by more sophisticated transformable display devices, such as with 3×3×3 or 4×4×4 cubes rather than the simplified 2×2 cube embodiment depicted above. For example, the cube surface can contain 4 halves (or 8 quarters), rather than 2 halves (and 4 quarters), so that the player can join any of the two halves (or 8 quarters) in one panel, thus choosing a different plot line of the two (or more than two) available lines. The plot can diverge into different plot lines, which can join again, or even turn back, creating a plot loop (e.g., for a science fiction story about time travel).

ADDITIONAL NOTES AND EXAMPLES

Example 1 is a transformable-display device, comprising: a plurality of peripheral elements situated around a central body, each of the peripheral elements including outward-facing surfaces and a plurality of electronic displays on the outward-facing surfaces, wherein the peripheral elements are movable and repositionable relative to other ones of the peripheral elements to achieve different device configuration states; and computing hardware arranged in one or more of the peripheral elements, including at least one processor, memory, and display controller circuitry, the computing hardware being operatively coupled to each of the electronic displays; wherein the computing hardware is operative to implement a graphical user interface (GUI) that facilitates dynamic user interaction with visual-narrative content such that the visual-narrative content is displayed on the plurality of electronic displays and visually modified in response to movement of the peripheral elements.

In Example 2, the subject matter of Example 1 includes, wherein the peripheral elements are movable about the central body by rotation.

In Example 3, the subject matter of Examples 1-2 includes, wherein the visual-narrative content is visually modified in response to movement of the peripheral elements to achieve a specific device configuration state.

In Example 4, the subject matter of Example 3 includes, wherein the visual-narrative content is visually modified in response to additional criteria including passage of time following movement of the peripheral elements.

In Example 5, the subject matter of Examples 1-4 includes, wherein the visual-narrative content is visually modified by variation of image quality.

In Example 6, the subject matter of Examples 1-5 includes, wherein the visual-narrative content is visually modified by addition of content.

In Example 7, the subject matter of Examples 1-6 includes, wherein the visual-narrative content is visually modified by addition of animation.

In Example 8, the subject matter of Examples 1-7 includes, wherein the visual-narrative content is visually modified by addition of text.

In Example 9, the subject matter of Examples 1-8 includes, wherein the visual-narrative content is visually modified by playing of a video clip.

In Example 10, the subject matter of Examples 1-9 includes, wherein the visual-narrative content is visually modified by degrading a baseline image at a first time, and by enhancing the baseline image at a second time.

Example 11 is a method for implementing a graphical user interface (GUI) in a transformable-display device having multiple display screens movable relative to one another, the method comprising: initially displaying a panel of interest, the panel of interest including a plurality of panel sections spanning a corresponding plurality of the display screens, wherein the initially displaying of the panel of interest includes, displaying the panel sections in a fragmented configuration on non-adjacent display screens; testing whether, through movement of the display screens, the initially-displayed sections of the panel of interest are aligned to form a contiguous image across adjacent display screens; and in response to a result of the testing being indicative of successful alignment of the panel of interest, updating the displaying of the panel of interest with at least one image enhancement.

In Example 12, the subject matter of Example 11 includes, wherein the initially displaying of the panel of interest comprises displaying the sections of the panel of interest with a baseline quality, and wherein the method further comprises displaying other content on other display screens of the transformable-display device with degraded quality.

In Example 13, the subject matter of Examples 11-12 includes, wherein updating the displaying of the panel of interest with at least one image enhancement includes adding content to at least a portion of the panel of interest.

In Example 14, the subject matter of Example 13 includes, wherein updating the displaying of the panel of interest with at least one image enhancement includes adding text to at least a portion of the panel of interest.

In Example 15, the subject matter of Examples 13-14 includes, wherein updating the displaying of the panel of interest with at least one image enhancement includes adding an animation to a portion of the panel of interest.

In Example 16, the subject matter of Examples 11-15 includes, in response to a result of the testing being indicative of successful alignment of the panel of interest, updating the displaying of the panel of interest with at least one image degradation after a predefined time duration.

In Example 17, the subject matter of Examples 11-16 includes, wherein updating the displaying of the panel of interest with at least one image degradation includes de-saturating the displayed panel of interest.

In Example 18, the subject matter of Examples 11-17 includes, wherein updating the displaying of the panel of interest with at least one image degradation includes obfuscating the displayed panel of interest.

In Example 19, the subject matter of Examples 11-18 includes, wherein updating the displaying of the panel of interest with at least one image enhancement includes enhancing image quality of the panel of interest.

Example 20 is at least one non-transitory machine-readable medium comprising instructions that, when executed on at least one processor of a transformable-display device having multiple display screens movable relative to one another, cause the device to implement a graphical user interface (GUI) by implementing the method according to any one of Examples 11-19.

CONCLUSION

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112(f) of 35 U.S.C. are not to be invoked unless the specific terms "means for" or "step for" are recited in a claim.

What is claimed:
1. A transformable-display device, comprising:
a plurality of peripheral elements situated around a central body, each of the peripheral elements including outward-facing surfaces and a plurality of display screens on the outward-facing surfaces, wherein the peripheral elements are movable and repositionable relative to other ones of the peripheral elements to achieve different device configuration states; and
computing hardware arranged in one or more of the peripheral elements, including at least one processor, memory, and display controller circuitry, the computing hardware being operatively coupled to each of the display screens;

wherein the computing hardware is operative to implement a graphical user interface (GUI) that facilitates dynamic user interaction with visual-narrative content such that the visual-narrative content is displayed on the plurality of display screens and visually modified in response to movement of the peripheral elements, wherein the implementing of the graphical user interface (GUI) comprises:

initially displaying a panel of interest, the panel of interest including a plurality of panel sections spanning a corresponding plurality of the display screens, wherein the initially displaying of the panel of interest includes displaying the panel sections in a fragmented configuration on non-adjacent display screens;

testing whether, through the movement of the display screens, the initially-displayed sections of the panel of interest are aligned to form a contiguous image across adjacent display screens;

in response to a result of the testing being indicative of successful alignment of the panel of interest, updating the displaying of the panel of interest with at least one image enhancement; and in response to the result of the testing being indicative of successful alignment of the panel of interest, updating the displaying of the panel of interest with at least one image degradation after a predefined time duration.

2. The transformable-display device of claim 1, wherein the peripheral elements are movable about the central body by rotation.

3. The transformable-display device of claim 1, wherein the visual-narrative content is visually modified in response to movement of the peripheral elements to achieve a specific device configuration state.

4. The transformable-display device of claim 3, wherein the visual-narrative content is visually modified in response to additional criteria including passage of time following movement of the peripheral elements.

5. The transformable-display device of claim 1, wherein the visual-narrative content is visually modified by variation of image quality.

6. The transformable-display device of claim 1, wherein the visual-narrative content is visually modified by addition of content.

7. The transformable-display device of claim 1, wherein the visual-narrative content is visually modified by addition of animation.

8. The transformable-display device of claim 1, wherein the visual-narrative content is visually modified by addition of text.

9. The transformable-display device of claim 1, wherein the visual-narrative content is visually modified by playing of a video clip.

10. The transformable-display device of claim 1, wherein the visual-narrative content is visually modified by degrading a baseline image at a first time, and by enhancing the baseline image at a second time.

11. A method for implementing a graphical user interface (GUI) in a transformable-display device having multiple display screens movable relative to one another, the method comprising:

initially displaying a panel of interest, the panel of interest including a plurality of panel sections spanning a corresponding plurality of the display screens, wherein the initially displaying of the panel of interest includes displaying the panel sections in a fragmented configuration on non-adjacent display screens;

testing whether, through movement of the display screens, the initially-displayed sections of the panel of interest are aligned to form a contiguous image across adjacent display screens;

in response to a result of the testing being indicative of successful alignment of the panel of interest, updating the displaying of the panel of interest with at least one image enhancement; and in response to the result of the testing being indicative of successful alignment of the panel of interest, updating the displaying of the panel of interest with at least one image degradation after a predefined time duration.

12. The method of claim 11, wherein the initially displaying of the panel of interest comprises displaying the sections of the panel of interest with a baseline quality, and wherein the method further comprises displaying other content on other display screens of the transformable-display device with degraded quality.

13. The method of claim 11, wherein updating the displaying of the panel of interest with at least one image enhancement includes adding content to at least a portion of the panel of interest.

14. The method of claim 13, wherein updating the displaying of the panel of interest with at least one image enhancement includes adding text to at least a portion of the panel of interest.

15. The method of claim 13, wherein updating the displaying of the panel of interest with at least one image enhancement includes adding an animation to a portion of the panel of interest.

16. The method of claim 11, wherein updating the displaying of the panel of interest with at least one image degradation includes de-saturating the displayed panel of interest.

17. The method of claim 11, wherein updating the displaying of the panel of interest with at least one image degradation includes obfuscating the displayed panel of interest.

18. The method of claim 11, wherein updating the displaying of the panel of interest with at least one image enhancement includes enhancing image quality of the panel of interest.

* * * * *